US011466442B2

(12) United States Patent
Lorkowski et al.

(10) Patent No.: US 11,466,442 B2
(45) Date of Patent: Oct. 11, 2022

(54) AIR ADMITTANCE VALVE

(71) Applicant: OATEY CO., Cleveland, OH (US)

(72) Inventors: Aaron Lorkowski, North Ridgeville, OH (US); Kenneth Brown, Columbia Station, OH (US); Kai Zhang, Cleveland, OH (US)

(73) Assignee: OATEY CO., Cleveland, OH (US)

( * ) Notice: Subject to any disclaimer, the term of this patent is extended or adjusted under 35 U.S.C. 154(b) by 703 days.

(21) Appl. No.: 16/323,332

(22) PCT Filed: Aug. 10, 2017

(86) PCT No.: PCT/US2017/046225
§ 371 (c)(1),
(2) Date: Feb. 5, 2019

(87) PCT Pub. No.: WO2018/031728
PCT Pub. Date: Feb. 15, 2018

(65) Prior Publication Data
US 2021/0317650 A1    Oct. 14, 2021

Related U.S. Application Data

(60) Provisional application No. 62/374,494, filed on Aug. 12, 2016.

(51) Int. Cl.
*E03F 5/08* (2006.01)
*E03F 1/00* (2006.01)
*F16K 15/02* (2006.01)

(52) U.S. Cl.
CPC ............... *E03F 5/08* (2013.01); *E03F 1/006* (2013.01); *F16K 15/023* (2013.01)

(58) Field of Classification Search
CPC ............ E03F 5/08; E03F 1/006; F16K 15/023
See application file for complete search history.

(56) References Cited

U.S. PATENT DOCUMENTS 2,629,456 A * 2/1953 Dick ..................... E03F 5/08
                                                    210/247
2,928,413 A * 3/1960 Hansen ................ F16K 17/19
                                                    137/493.9

(Continued)

FOREIGN PATENT DOCUMENTS

GB          2232461 A * 12/1990 ............. E03C 1/122

*Primary Examiner* — Craig M Schneider
*Assistant Examiner* — Frederick D Soski
(74) *Attorney, Agent, or Firm* — BakerHostetler (57) ABSTRACT

The present invention relates to an air admittance valve (AAV) that operates automatically at low pressures to selectively open and close an air passageway between an inlet and an outlet. The AAV comprises a valve body having a centrally disposed, internal valve chamber in communication with the ambient environment, and having a valve seat. The AAV includes a sealing member having a flexible diaphragm that is fastened to a support ring, the ring defining one or more lugs on an outer periphery thereof. The AAV further includes a cap member within which the sealing member may be disposed, such that the one or more lugs may interact with an interior surface of the cap. The sealing member may selectively seal or unseal from the valve seat in response to pressure differentials between the inlet and the outlet.

19 Claims, 8 Drawing Sheets

(56) References Cited

U.S. PATENT DOCUMENTS

| | | | |
|---|---|---|---|
| 3,791,401 A * | 2/1974 | Gorman | F16K 24/02 137/216.2 |
| 3,923,081 A * | 12/1975 | Persson | E03C 1/1225 137/217 |
| 4,185,654 A * | 1/1980 | Young | E03C 1/122 137/216.2 |
| 4,232,706 A * | 11/1980 | Ericson | E03C 1/12 137/216.2 |
| 4,273,153 A * | 6/1981 | Brown | B63J 2/10 137/454.5 |
| 4,436,107 A * | 3/1984 | Persson | E03C 1/122 137/314 |
| 4,493,339 A * | 1/1985 | Porter, Jr. | F16K 24/06 137/510 |
| 4,535,807 A * | 8/1985 | Ericson | E03C 1/122 137/533.31 |
| 4,974,632 A * | 12/1990 | Ericson | E03C 1/122 137/526 |
| 4,991,623 A * | 2/1991 | Ericson | E03C 1/122 137/216.2 |
| 5,048,562 A | 9/1991 | Frawley | |
| 5,273,068 A | 12/1993 | Duren | |
| 5,441,679 A * | 8/1995 | Chalich | B29C 45/1676 264/250 |
| 5,803,112 A * | 9/1998 | Andersson | E03C 1/108 137/217 |
| 5,881,759 A * | 3/1999 | Andersson | E03C 1/122 137/246 |
| 5,971,014 A * | 10/1999 | Duren | E03C 1/12 137/526 |
| 5,983,929 A * | 11/1999 | Andersson | E03C 1/12 137/216.2 |
| 6,308,731 B1 * | 10/2001 | Kawasaki | E03C 1/12 137/526 |
| 6,415,816 B1 | 7/2002 | Beckey et al. | |
| 6,557,825 B2 * | 5/2003 | Stone | F16J 15/064 251/152 |
| 7,270,146 B1 * | 9/2007 | Johnston | E03C 1/122 137/526 |
| 7,395,835 B1 * | 7/2008 | Gohlke | E03C 1/12 137/526 |
| 7,410,608 B1 * | 8/2008 | Gohlke | B29C 45/14344 137/15.19 |
| 7,422,030 B2 | 9/2008 | Stone | |
| 8,567,434 B2 * | 10/2013 | Ericson | E03C 1/1225 137/526 |
| 10,563,385 B1 * | 2/2020 | Ball | E03C 1/24 |
| 2002/0139952 A1 * | 10/2002 | Stone | F16L 55/1141 251/152 |
| 2005/0150037 A1 * | 7/2005 | Cornwall | E03C 1/122 4/211 |
| 2006/0011239 A1 * | 1/2006 | Stone | F16K 15/08 137/526 |
| 2006/0191576 A1 * | 8/2006 | McCoy | E03C 1/1225 137/526 |
| 2006/0260684 A1 | 11/2006 | Fangmeier | |
| 2007/0044846 A1 * | 3/2007 | Ashurst | F16K 15/023 137/513.3 |
| 2010/0032028 A1 * | 2/2010 | Trueb | E03C 1/12 137/526 |
| 2010/0139788 A1 * | 6/2010 | Lackey | F16K 24/06 137/526 |
| 2011/0180163 A1 * | 7/2011 | Jakubowski | F16K 15/063 137/526 |
| 2012/0261006 A1 * | 10/2012 | Cashen | F16K 15/148 137/488 |
| 2015/0308090 A1 * | 10/2015 | Cole | E03C 1/1225 137/526 |
| 2018/0305910 A1 * | 10/2018 | Heipp | E03C 1/232 |

\* cited by examiner

AIR ADMITTANCE VALVE

CROSS-REFERENCE TO RELATED APPLICATIONS

This application is the National Stage of International Application No. PCT/US2017/046225 filed Aug. 10, 2017, which claims priority to U.S. Provisional Patent Application No. 62/374,494, filed Aug. 12, 2016 the contents of which are hereby incorporated in their entirety by reference.

TECHNICAL FIELD

The present disclosure relates to an air admittance valve for providing automatic, low pressure, one-way venting into a closed system, such as a plumbing drain and waste system.

BACKGROUND

Air admittance valves are frequently used in a variety of plumbing applications to seal unwanted gases from escaping a plumbing system, but to also allow ambient air into the plumbing system to prevent negative pressure or a vacuum within the system. Thus, air admittance valves function as a one-way valve that seals at zero pressure and against higher, positive pressure airflow in a first direction (i.e., out of the plumbing system) but which unseals to allow lower pressure airflow in a second direction substantially opposite the first direction (i.e., into the plumbing system), which is on the order of 0.01 psi.

Exemplary air admittance valve assemblies are disclosed in Applicants' U.S. Pat. No. 6,415,816 ('816 patent) and U.S. Pat. No. 7,422,030 ('030 patent), which are both incorporated by reference herein. The '816 and '030 patents generally disclose air admittance valves having a valve body with a centrally disposed valve seat, defining a sealing edge. Applicants' patents further disclose a flexible tension sealing membrane that seals against the valve seat so as to selectively operate the air admittance valve. Notably, each of the '816 and '030 patents disclose a slidable carrier member for guiding the tension sealing membrane (i.e., diaphragm) with respect to the valve seat, where the carrier member is guided by a means provided within a valve cap.

The carrier structure according to these exemplary disclosures has had certain drawbacks in commercial implementations of the air admittance valve, including the risk of increased frictional resistance between the carrier structure and the guiding means on the valve cap. Because the carrier structures of such disclosures, as well as similar mechanical structures in other known air admittance valve patent references, are configured to mechanically translate along the means of the cap, these parts are constantly subjected to frictional forces and other mechanical wear. Over time, these sliding surfaces may become worn, roughened, and may generate frictional resistance that would cause the tension sealing membrane to fail to open or close under normal operating pressure differentials. Because air admittance valves need to operate under a specific range of pressure differentials and must remain sensitive to slight changes in pressure, this drawback could result in failure of the air admittance valve to operate as intended.

What is needed is an air admittance valve that permits the automatic sealing of a valve seat under lower pressures, but which is not susceptible to the mechanical wear-and-tear that has proved troublesome for existing air admittance valves on the market. What is also needed is an air admittance valve that may operate consistently and correctly over the long term to minimize the need to repair or replace the air admittance valve post-installation.

The air admittance valve of the present invention presents an improved design that reduces the number of moving parts required to selectively seal a closed system (i.e., a plumbing drain and waste system) from the ambient environment under fluctuating pressure differentials. The reduction of parts includes reduction of (and in some cases complete elimination of) mechanical parts that impart frictional forces capable of inducing long-term wear and tear on the valve. The result is an air admittance valve the functions properly over longer periods of time.

SUMMARY OF THE INVENTION

The present invention relates to an automatic, low pressure air admittance valve adapted for allowing ambient air (or other fluid) to pass into a closed system and to prevent discharge from the closed system into the ambient air.

The air admittance valve of the present invention comprises a sealing member having a flexible tensioned membrane (e.g., a diaphragm) that is over-molded onto a reinforcing, structurally rigid support ring. The diaphragm is configured to seal against a valve seat within the air admittance valve. The diaphragm has a radius, with respect to the diaphragm's center, which is greater than a radius of the valve seat, with respect to the valve seat's center. The support ring of the sealing member defines a center and includes at least one, but preferably a plurality of lugs that extend radially outwardly from the support ring. In one embodiment, the lugs are integrally formed with the support ring and are equidistantly disposed from one another about the periphery of the support ring. Each of the lugs defines a radius (or radial distance) with respect to the center of the support ring, and each of the lugs is configured to selectively contact an interior surface of a valve cap such that the support ring will be bounded by the interior surface of the cap. The interior surface of the valve cap has a radius that is greater than the radius of each one of the plurality of lugs, so as to permit the entirety of the support ring to fit within the inner portion (or cavity) of the valve cap. However, so as to prevent the sealing member from becoming overly laterally displaced relative to the valve seat (a result which would inhibit sealing of the flexible sealing member (diaphragm) relative to the valve seat), the radius of the valve cap's inner surface must not exceed the sum of the radii of the lugs and diaphragm, minus the radius of the valve seat. The relationship of these radii may also be understood with reference to the following equation: $R_V < R_D < R_L < R_C (R_L + R_D - R_V)$, where $R_V$=the radius of the valve seat, $R_D$=the radius of the diaphragm, $R_L$=the radius of any one of the lugs, and $R_C$=the radius of the inner surface of the valve cap. These dimensions will allow the diaphragm of the sealing member to continue to seal against the valve seat despite any lateral displacement of the sealing member within the cap and relative to the valve seat.

In one aspect, the present invention relates to an air admittance valve for selectively venting ambient air into a plumbing drain and waste system, according to an embodiment includes a valve body having an upper portion and a bottom portion for connecting to the plumbing drain and waste system. The upper portion of the valve body may include a centrally disposed air inlet chamber defining a center, with the inlet chamber being in communication with an ambient environment. The upper portion may also include at least one outlet chamber in communication with the plumbing drain and waste system that is disposed radially outwardly from the air inlet chamber within the valve body. In another aspect, the air inlet chamber may have an annular edge defining a valve seat, the valve seat defining a radius $R_1$ with respect to the center. The air admittance valve may further include a sealing member configured to seal against the valve seat so as to selectively block a flow of air from passing between the ambient environment and the plumbing drain and waste system. The sealing member may further include: 1) a flexible sealing portion defining a center and a radius $R_2$ with respect to the center that is greater than $R_1$, and 2) a rigid support ring disposed circumferentially about the flexible sealing portion, the support ring including at least one lug projecting therefrom, the lug defining a radius $R_3$ with respect to the center, where $R_3$ is greater than $R_2$. The air admittance valve may further include a cap structure connected to the upper portion of the valve body and defining an inner surface having a radius $R_4$, where $R_1 < R_2 < R_3 < R_4 < (R_3 + R_2 - R_1)$.

In a further aspect, the present invention relates to a one-way valve for selectively opening or closing a boundary between an inlet and an outlet so as to enable or prevent, respectively, the flow of fluid therebetween. The one-way valve may include a body having a lower connecting portion and an upper valve portion integrally connected to the lower portion, the upper valve portion including a centrally disposed valve chamber having an upper peripheral portion that terminates an edge, and the edge defining a valve seat. The one-way valve may further include a sealing member that is movable relative to the valve seat and configured to selectively seal against the valve seat, the sealing member defining a diaphragm and a support ring attached to an outer portion of the diaphragm, and the support ring including at least one lug. The one-way valve may further include a cap connectable to the body at the upper valve portion so as to create an airtight seal therewith, the cap having an inner portion that is defined by an interior surface. In a further aspect, the sealing member of the one-way valve may be configured to translate and angulate within the inner portion of the cap, and the interior surface may also be configured to selectively abut one or more of the at least one lug.

DETAILED DESCRIPTION

Figure 1:
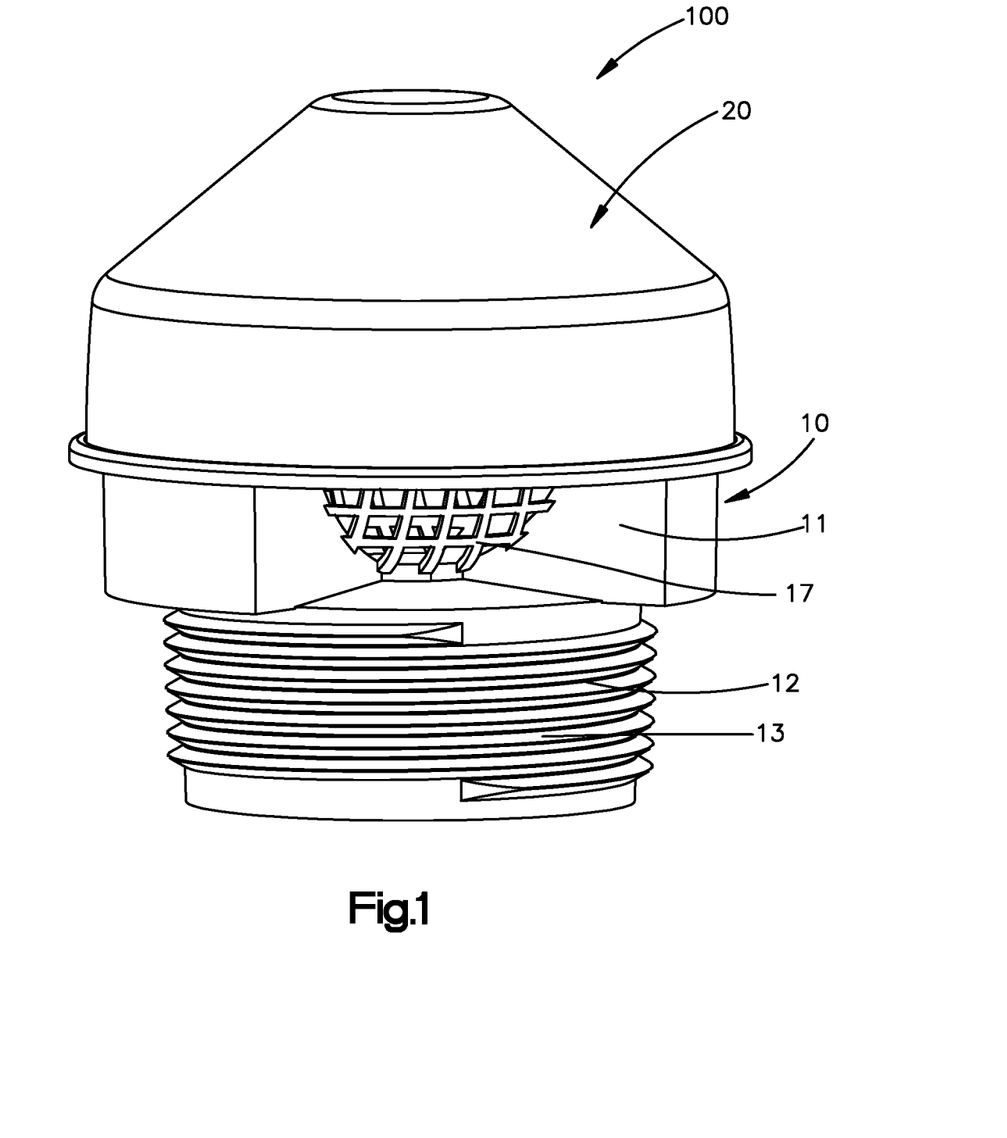
FIG. 1 is a side plan view of a fully assembled air admittance valve in accordance with an embodiment.
Figure 2:
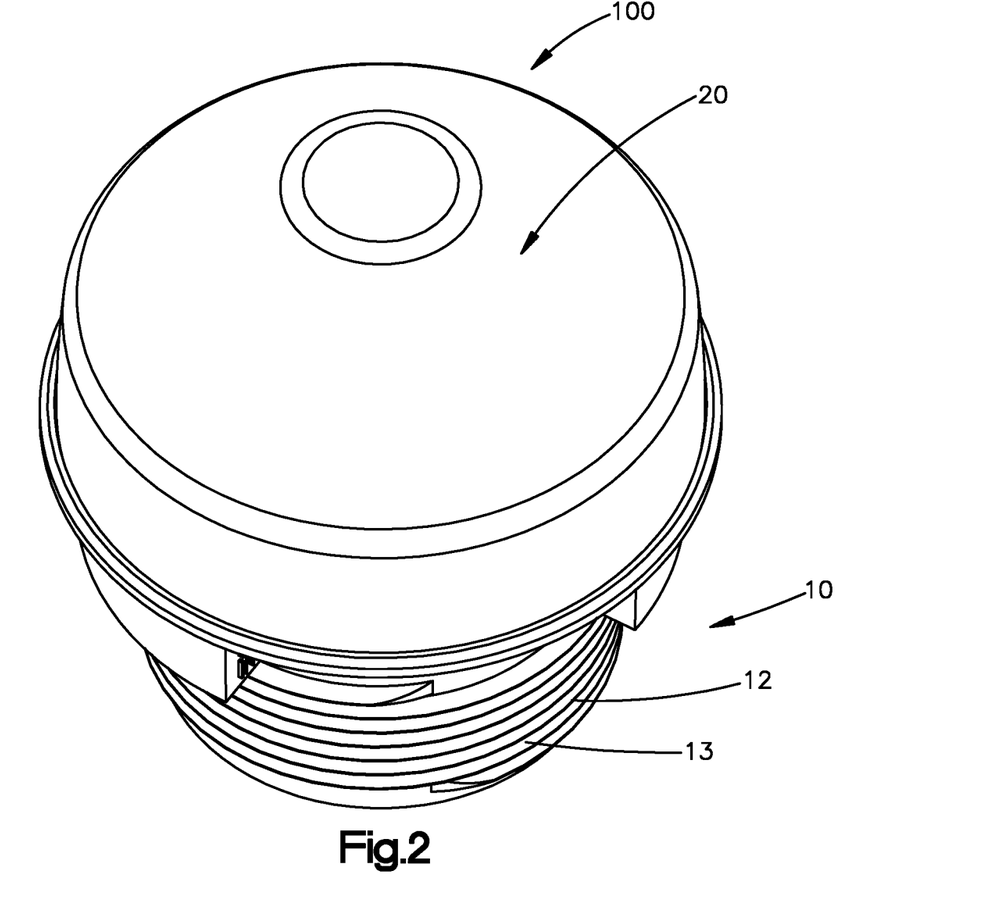
FIG. 2 is a perspective view of the fully assembled air admittance valve of FIG. 1.

FIGS. 1-2 illustrate a fully assembled configuration of an air admittance valve 100 (or one way valve) in accordance with an embodiment of the invention. The air admittance valve 100 comprises a valve body 10, a cap member 20 mounted thereon, and a sealing member 50 (see FIGS. 3-5 and 10-11). The valve body 10 may generally be divided into a top portion 11 and a bottom portion 12. The bottom portion 12 of the valve body 10, as shown, includes a connecting portion which may be connected to a closed system, such as a plumbing system, by way of a set of externally disposed threads 13 on an outer portion of the bottom portion 12. The threaded outer portion 13 is provided to permit the air admittance valve to be secured to an internally threaded conduit or pipe (not shown), for example, or to an adapter structure connected to the top of a vent pipe. The pipe threads are preferably NPT threads (National Pipe Threads). Although threads 13 are illustrated, it will be understood that alternative connective mechanisms may be utilized, such as, and by way of non-limiting example, the use of adhesives. The top portion of the valve body 10, in one aspect, is configured to receive the cap member 20 near an outer periphery thereof, as will be described in greater detail below, such that in the fully assembled configuration, the cap member 20 forms an air-proof seal with the valve body 10. As shown more clearly in FIGS. 3-8, and as will be described in greater detail below, the top portion 11 of the valve body 10 in another aspect houses an air passageway that separates an air inlet 17 (in communication with the ambient environment) from an air outlet 18 (in communication with the closed system) in the form of one or more ports or chambers.

The air admittance valve 100 is constructed and arranged for connection to a vent portion of a drain-waste-vent (DWV) plumbing system to permit ambient air to enter the system during negative pressure or vacuum conditions and to seal the drainage system during positive pressure conditions to thereby prevent gases from entering the ambient environment. The air admittance valve 100 is constructed for connection to other systems requiring one-way venting from the ambient environment under low differential pressures, (i.e., on the order of 0.01 psi).

Figure 3:
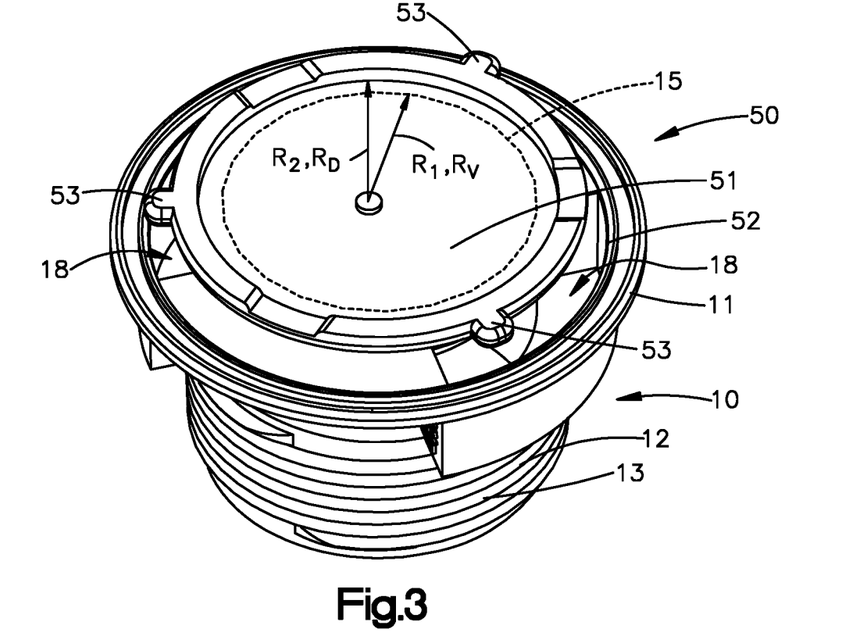
FIG. 3 is a perspective view of a partially assembled air admittance valve in accordance with an embodiment.
Figure 4:
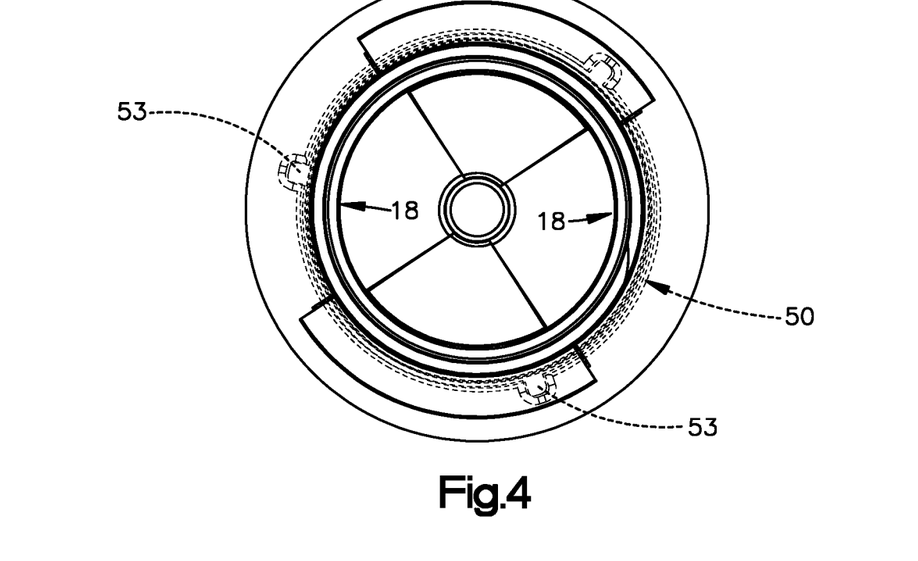
FIG. 4 is a bottom plan view of the partially assembled air admittance valve FIG. 3.
Figure 5:
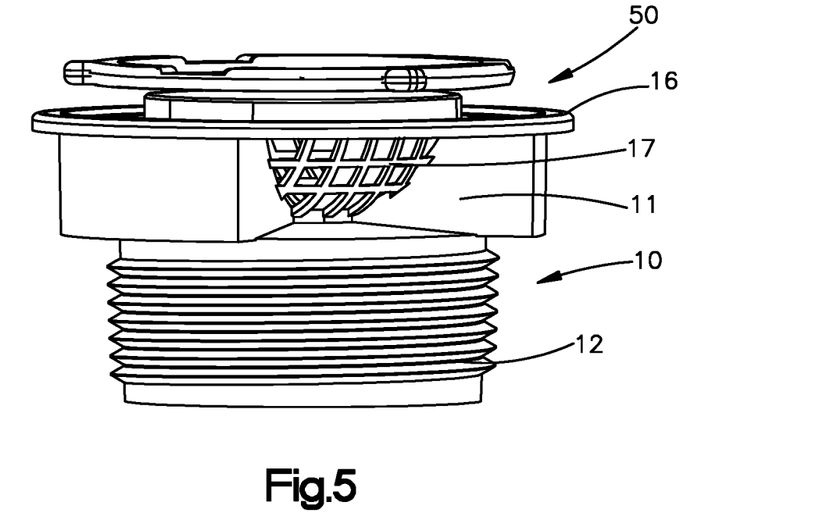
FIG. 5 is a side plan view of the partially assembled air admittance valve of FIGS. 3 and 4.

FIGS. 3-5 illustrate a partially assembled configuration of the air admittance valve 100 in accordance with an embodiment. As shown, the cap member 20 has been removed to better illustrate the sealing member 50 and its position relative to the valve body 10 within the air admittance valve 100 when creating a seal. As shown in these views, the air admittance valve 100 comprises a valve chamber 14 centrally disposed within the top portion 11 of the valve body 10. The valve chamber 14 as shown comprises a hemispherical or cupped wall terminating in an upwardly extending valve seat 15 (see FIGS. 6-7). As shown, the outer peripheral area of the top portion of the valve body 10 comprises a connecting ridge 16 for receiving a bottom portion of the cap member 20. As will be described in further detail below (and with reference to FIGS. 6-8), the valve chamber 14 is in direct communication with the ambient environment through two opposing webbed, inlet openings 17 (or simply, inlets 17), although it will be understood that any number of inlet openings 17 may be utilized. As shown in FIG. 4, the valve body 10 includes two outlet ports 18 (or simply, outlets 18) that are radially spaced from the valve chamber 14, although it will be understood that any number of outlet ports 18 may be utilized.

As shown in the partially assembled configuration of FIGS. 3-5, the area bounded internally by the valve seat 15 defines a boundary that separates the air inlets 17 from the air outlets 18. In that respect, it will be understood that the interaction of sealing member 50 with the valve seat 15 creates an air-tight seal that will prevent (in a sealed configuration) or allow (in an unsealed configuration) the exchange of air (or other fluid) across the boundary. As will be described in greater detail below, the sealing member 50 is responsive to pressure differentials between the closed system and the ambient environment so as to selectively seal or unseal the boundary. Generally speaking, when the pressure is greater in the closed system than in the ambient environment ("positive pressure"), the sealing member 50 will automatically be pressed against the valve seat 15 so as to form the air-tight seal. When the pressure in the closed system and the ambient environment are equal ("zero pressure"), the sealing member 50 will still seal against the valve seat 15 due to operation of gravity, given a selected weight of the sealing member 50. When the pressure is less in the closed system than in the ambient environment ("negative pressure" or "vacuum"), the sealing member 50 will automatically rise within the valve body 10 to unseal from the valve seat 15. Thus, under negative pressure or vacuum conditions, air will be drawn from the ambient environment and into the closed system until such time as the pressure differential is equalized, which will cause the sealing member 50 to, once again, seal against the valve seat 15 under zero pressure.

FIGS. 6-9 illustrate a valve body 10 of the air admittance valve 100 in greater detail. The valve body 10 generally comprises a tubular structure that defines a valve body axis ($A_1$) running through a center thereof. As shown, the valve chamber 14 is cup-shaped or hemispherical and it is positioned centrally in the valve body 10. The valve chamber 14 includes the upper peripheral portion that extends upwardly and terminates in the valve seat 15. The valve chamber 14 is shown comprising a wall having generally four quadrants, including opposing apertured areas having a web, where the opposing aperture areas define the opposing air inlet openings 17. The opposing apertured wall portions at the inlets 17 of the valve chamber 14 are shown to have a generally triangular configuration. The apertured wall portions are provided to keep debris and insects from entering the interior of the valve chamber 14 and to thereby secure the integrity of the sealing function of the sealing member 50 on the valve seat 15. The upper peripheral portion includes opposing walls 19 which connect the valve chamber 14 and define the opposing air outlet chambers 18. The outlet chambers 18 are in communication with the bottom portion 12 of the valve body 10.

Figure 10:
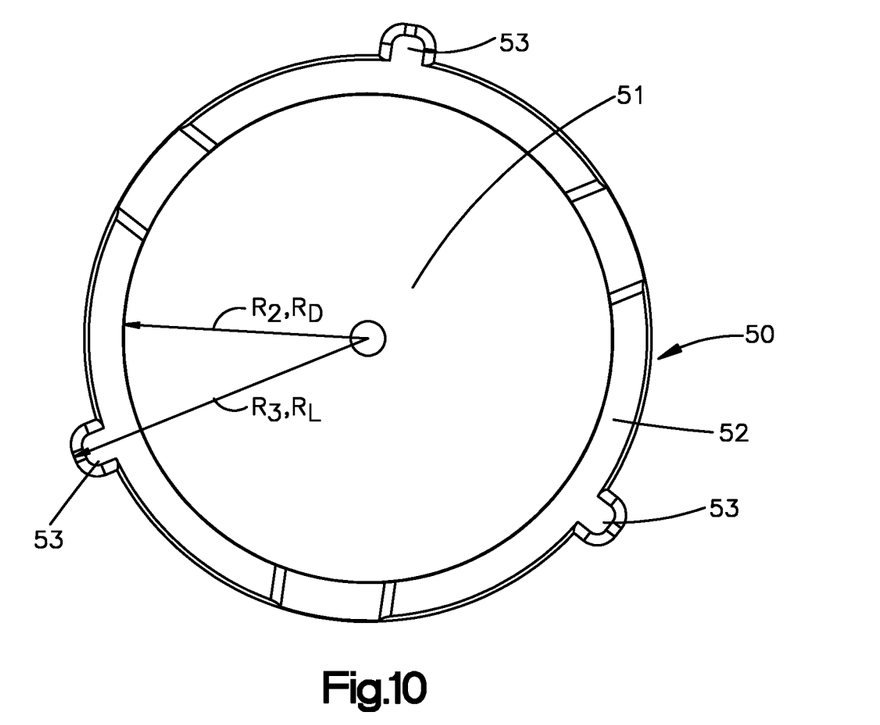
FIG. 10 is a top plan view of a sealing member of the air admittance valve in accordance with an embodiment.
Figure 11:
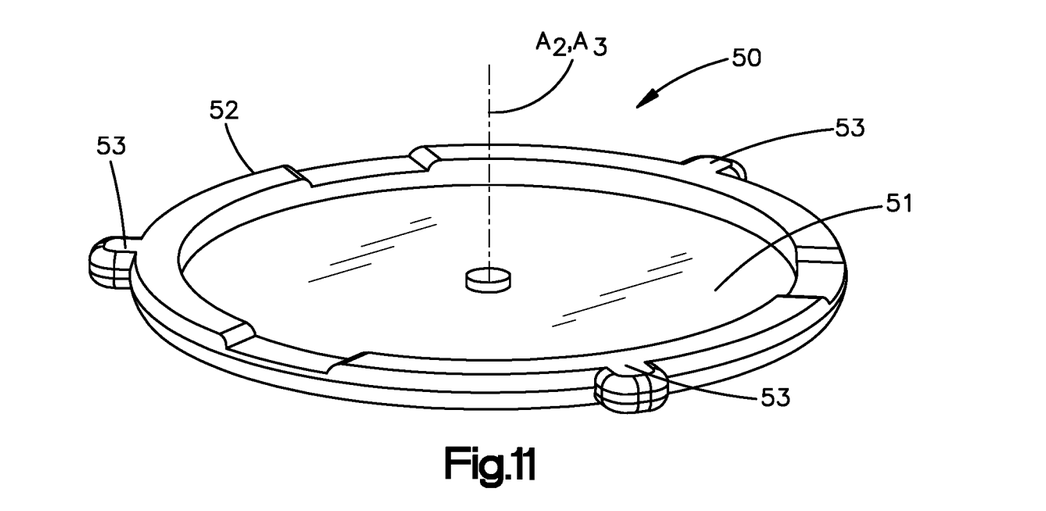
FIG. 11 is a top perspective view of the sealing member of FIG. 10.

In FIGS. 10 and 11 the sealing member 50 is shown comprised of a thin circular diaphragm 51 that is fixed in a constrained state to a rigid support ring 52. In that respect, the diaphragm 51 and the support ring 52 each define respective central axes $A_2$, $A_3$ (or centers) that are coaxial with one another. The diaphragm 51 is preferably constructed of an elastomeric material that is fixed to the support ring 52 at its peripheral edge by, for example, overmolding, mechanical fixation, or adhesive. By virtue of its attachment to the support ring 52, the diaphragm 51 is sufficiently tensioned such that it appears substantially planar in a relaxed state. When the diaphragm 51 of the sealing member 50 is not sealed against the valve seat 15, the diaphragm 51 defines a relaxed (or baseline) tensioned state wherein a fixed, minimum amount of tension exists within the diaphragm 51. It is contemplated that the elastomeric material in the diaphragm 51 may comprise rubber or silicone, while the rigid support ring 52 may comprise polypropylene sulfide Polyvinyl Chloride (PVC), Acrylonitrile-Butadiene-Styrene (ABS), Nylon or other rigid plastic. However, one of skill in the art will appreciate that other types of elastomeric and rigid materials may be substituted for the diaphragm and support ring 52, respectively, without departing from the scope of the invention.

As noted previously, the diaphragm 51 of the sealing member 50 is configured to seal against the valve seat 15 in response to the pressure differential between the closed system and the ambient environment. As best shown in FIG. 3, the diaphragm 51 has a radius ($R_D$), with respect to the center of the diaphragm 51, that is greater than a radius of the valve seat 15 ($R_V$), with respect to the valve seat 15's center. As shown, the support ring 52 includes three lugs 53 (or guide tabs) that extend radially outwardly from the support ring 52 and which are equally spaced apart about the circumference of the support ring 52 (as illustrated, by approximately 120.degree). One of ordinary skill will readily understand that the support ring 52 may include any number of lugs 53 about its periphery, and that such lugs 53 may be unevenly distributed about the circumference without departing from the scope of the invention. As shown in FIGS. 10 and 11, the lugs 53 may be integrally formed with the support ring 52, such that the support ring could be manufactured, for example, from a single injection mold. Each of the lugs 53 defines a radius ($R_L$), as measured with respect to the center of the support ring 52 that is greater than the radius of the diaphragm 51, and each of the lugs 53 is configured to selectively contact an interior surface of the cap member 20 (when the air admittance valve 100 is in the fully assembled configuration) such that the support ring 52, and hence the sealing member 50, will be laterally constrained by the interior surface of the cap. The interior surface of the cap member 20 has a radius ($R_C$) that is greater than the radius of each one of the plurality of lugs 53, so as to permit the entirety of the support ring 52 to fit within the inner portion (or cavity) of the cap member 20. However, so as to prevent the sealing member 50 from becoming overly laterally displaced relative to the valve seat 15 (a result which would inhibit sealing of the flexible sealing member 50 (and diaphragm 51) relative to the valve seat 15), the radius of the cap member 20's inner surface must not exceed the sum of the radii of the lugs 53 and diaphragm 51, minus the radius of the valve seat 15. The dimensional relationship of these radii may also be understood with reference to the following equation: $R_V < R_D < R_L < R_C (R_L + R_D - R_V)$. The relative nature of these dimensions will ensure that the diaphragm 51 of the sealing member 50 continues to seal against the valve seat 15 despite any lateral displacement of the sealing member 50 within the cap member 20 and relative to the valve seat 15.

Figure 6:
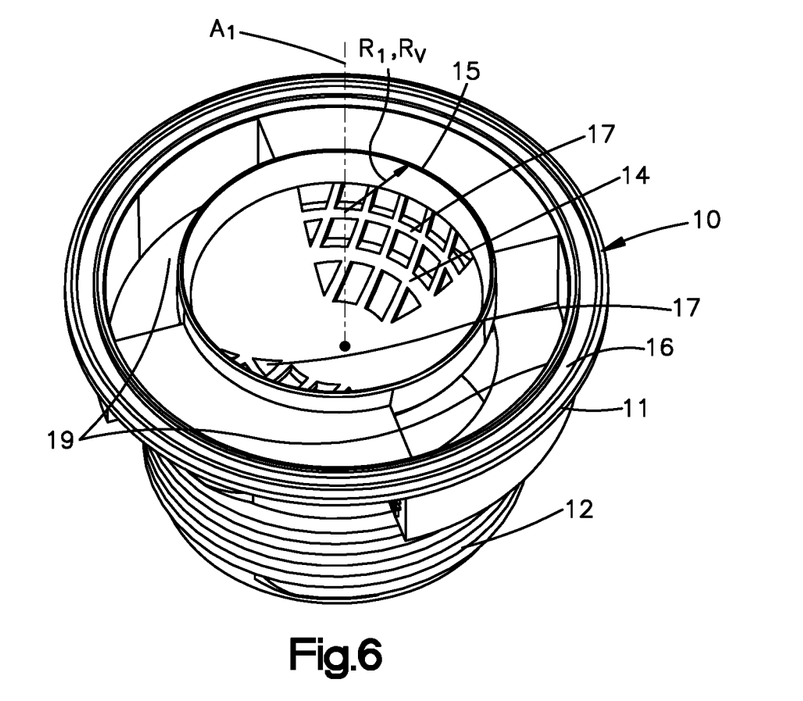
FIG. 6 is a top perspective view of a valve body of the air admittance valve in accordance with an embodiment.
Figure 7:
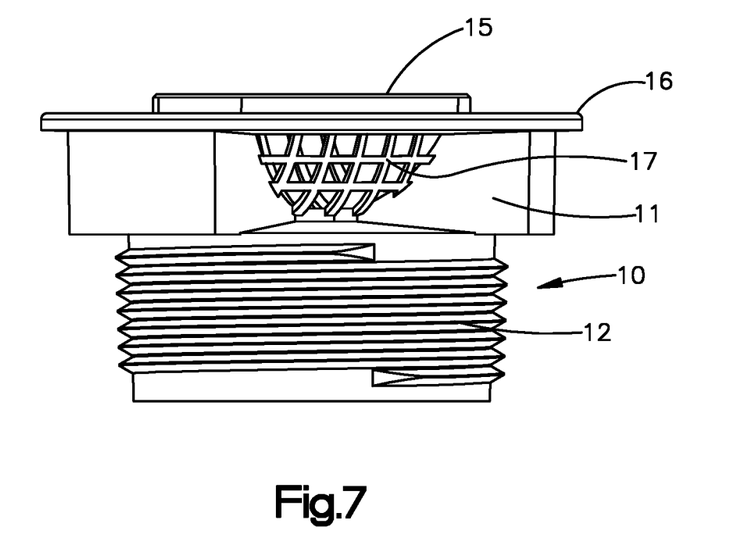
FIG. 7 is a side plan view of the valve body of FIG. 6.
Figure 8:
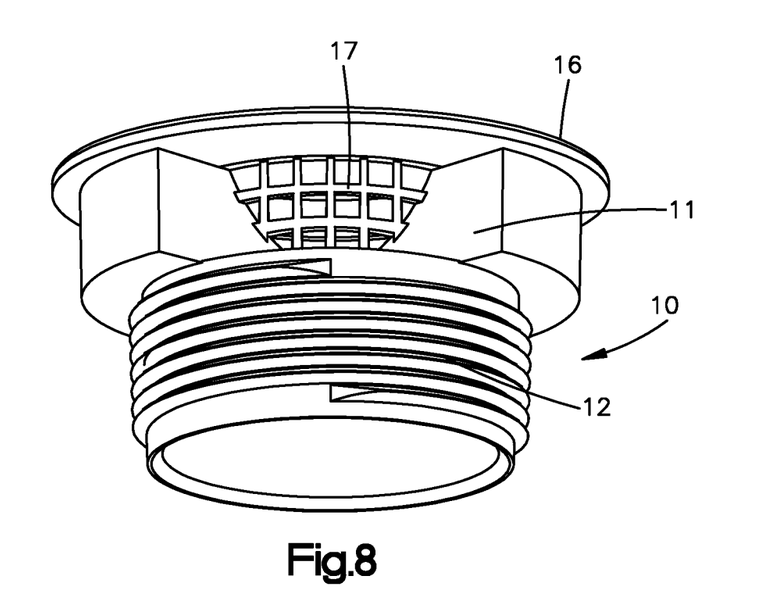
FIG. 8 is a bottom perspective view of the valve body of FIGS. 6 and 7.
Figure 9:
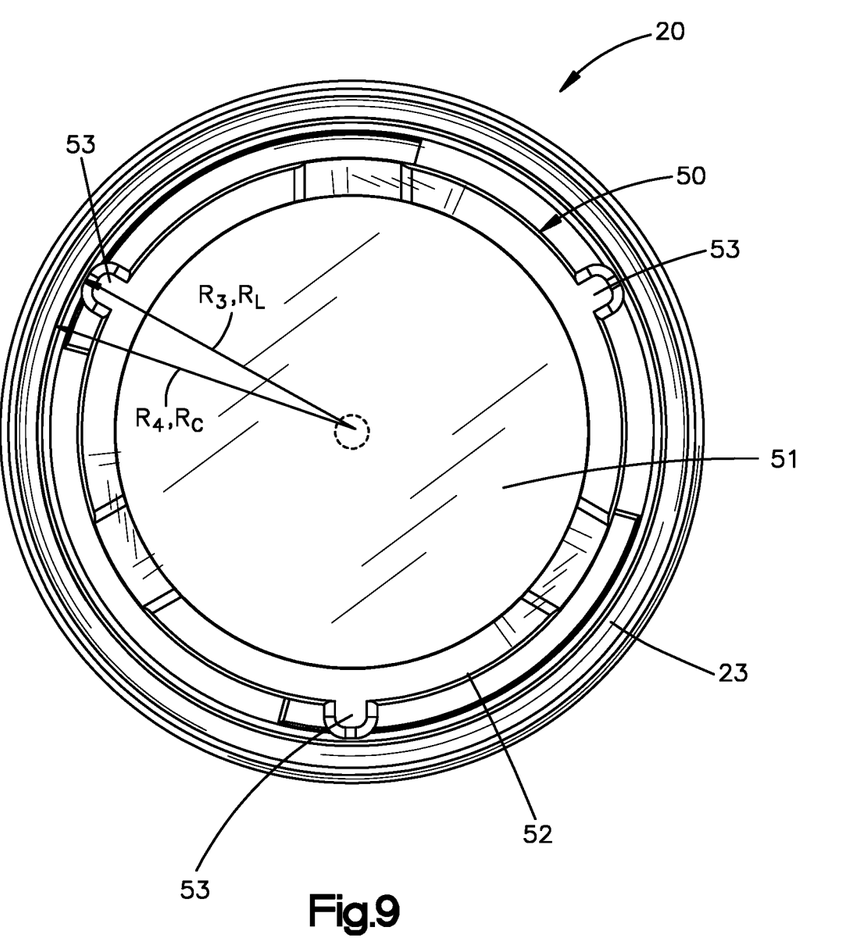
FIG. 9 is a bottom view of a partially assembled air admittance valve in accordance with an embodiment.

As noted above, the combined weight of the constituent components of the sealing member 50 is specifically formulated to exert enough downward force against the valve seat 15 to seal the diaphragm 51 of the sealing member 50 against the valve seat 15 at zero pressure. In order for the sealing member 50 to unseal from the valve seat 15 under negative pressure, the pressure differential needs to exert sufficient upwards force on the sealing member 50 over its surface area, so that the pressure may overcome the force of gravity that is exerted downwardly on the sealing member 50. The surface area of the sealing member 50 is partially defined by the diaphragm 51. In that respect, a threshold pressure differential may exist, such that when the threshold pressure is reached, the sealing member 50 will become unsealed from the valve seat 15 such that ambient air may pass through the air admittance valve 100 and into the closed system. One of skill in the art will understand that the threshold pressure may be calculated by dividing the downwardly directed force (weight) by the surface area of the sealing member 50. It is desirable that the threshold pressure be on the order of approximately 0.01 pounds per square inch (psi), but it being further understood that a different selection of materials for the diaphragm 51 and support ring 52 may adjust the weight of the sealing member 50, thus causing a proportionate shift in the threshold pressure. As shown in FIG. 6, the valve seat 15 in cross section is shown to have a sealing edge formed of a rounded edge and an angled wall edge which provides a relief area for the tensioned sealing membrane when in the sealing position. Thus, the thin diaphragm 51 is able to reliably seal against the valve seat 15 in a flexed condition. However, one of skill in the art will appreciate this it is undesirable for a substantial vacuum to exist within the closed system. For this reason, the air admittance valve 100 will open (or crack) at a relatively low pressure. For example, The American Society of Safety Engineers (ASSE) promulgates a set of standards, whereby according to ASSE Standard No. 1051 (ASSE 1051) air admittance valves must open under a vacuum pressure of 0.04 PSI, which is equivalent to 1-inch water column. Thus, one of ordinary skill in the art will readily understand that, although variations can be made to the selection of materials, which may cause variance in the threshold pressure, that according to ASSE 1051, the valve must open up at least under 0.04 PSI of threshold vacuum pressure.

Figure 12:
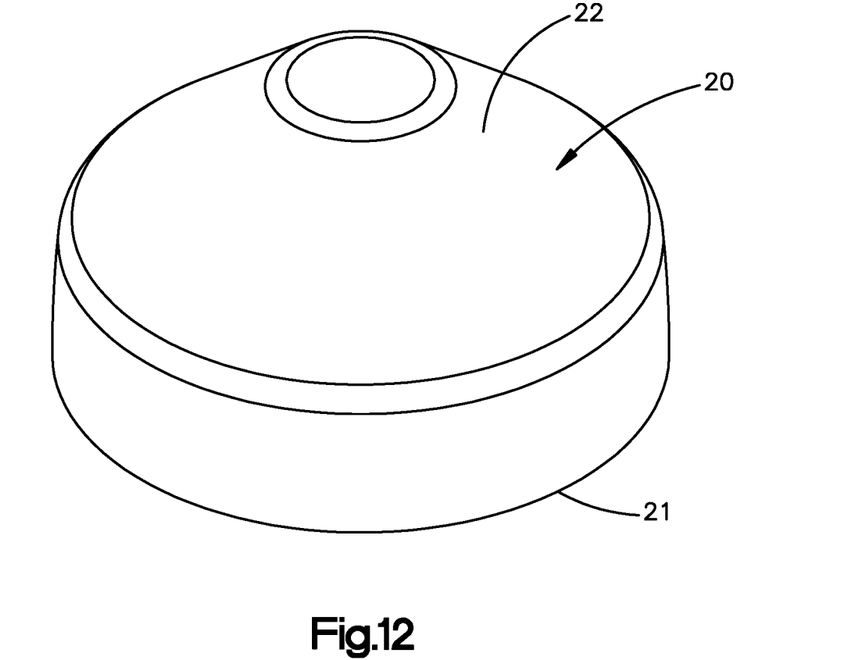
FIG. 12 is a top perspective view of a valve cap of the air admittance valve in accordance with an embodiment.
Figure 13:
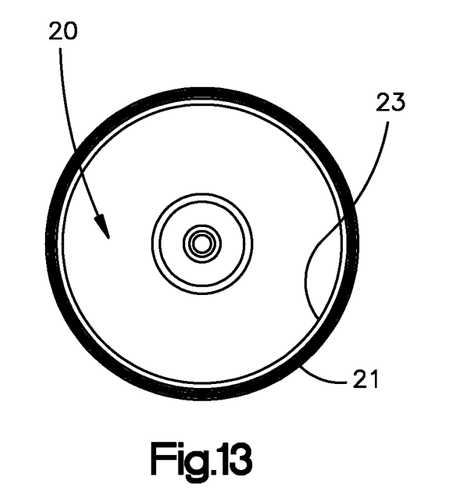
FIG. 13 is a bottom plan view of the valve cap of FIG. 12.
Figure 14:
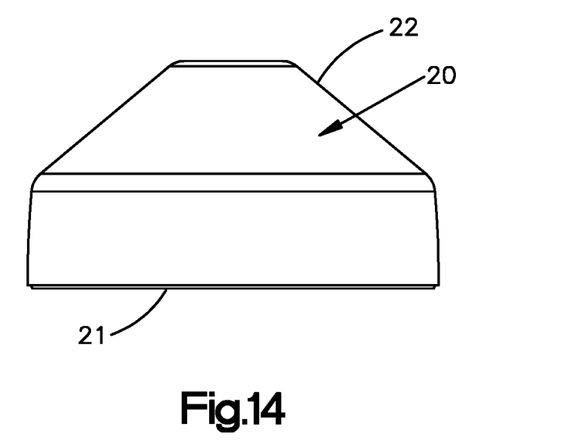
FIG. 14 is a side plan view of the valve cap of FIGS. 12 and 13.

In FIGS. 12-14, the cap member 20 is shown comprised of a circular, unitary structure having a curvilinear downwardly sloping cross section. A bottom portion 21 of the cap member 20 may have a fixed diameter, while a top portion 22 may slope downwardly from an apex to the bottom portion 21. The cap member 20 is preferably molded of a plastic composition, such as PVC or the like, and the bottom portion 21 has a lower end for connection to the valve body 10. Alternatively, the cap member 20 may be provided as a clear molded plastic structure so that one is able to see the inner workings of the device so that users may see the parts and operation of the device when it is connected to a closed system, such as a DWV. As shown in FIGS. 12 and 13, an interior surface 23 of the cap member 20 near the bottom portion has a substantially constant diameter, and hence a constant radius ($R_C$), and the interior surface 23 defines an inner portion of the cap member 20. The inner portion is configured to accommodate the centrally disposed valve seat 15, as well as to accommodate upward movement (translation) of the sealing member 50 when the sealing member 50 is unsealed from the valve seat 15. The inner portion includes sufficient volume so that the sealing member 50 may move freely within the space, but where the sealing member 50 is laterally bounded by the lugs 53 extending from the support ring 52 as they make contact with the interior surface 23 of the cap member 20. In that regard, the sealing member 50 may angularly rotate (angulate) with respect to the axis of the valve seat 15 when the sealing member 50 is unsealed from the valve seat 15, and the sealing member 50 may become slightly laterally displaced from the valve seat 15 such that the axis of the diaphragm 51 is no longer coaxial with the axis of the valve seat 15. However, one of skill in the art will appreciate that, due at least to the constraints imposed by the relationship of the various radii ($R_L$, $R_P$, $R_D$, and $R_C$), the sealing member 50 will properly seal against (and thereby form a seal with) the valve seat 15 under the pressure conditions noted above.

What is claimed is:

1. An air admittance valve for selectively venting ambient air into a plumbing drain and waste system, the air admittance valve comprising:
    a valve body having an upper portion and a bottom portion for connecting to the plumbing drain and waste system, the upper portion including a centrally disposed air inlet chamber defining a center, the inlet chamber in communication with an ambient environment and at least one outlet chamber in communication with the plumbing drain and waste system that is disposed radially outwardly from the air inlet chamber within the valve body, the air inlet chamber having an annular edge defining a valve seat, the valve seat defining a radius $R_1$ with respect to the center;
    a sealing member configured to seal against the valve seat so as to selectively block a flow of air from passing between the ambient environment and the plumbing drain and waste system, the sealing member including: 1) a flexible sealing portion defining a center and a radius $R_2$ with respect to the center that is greater than $R_1$, and 2) a rigid support ring disposed circumferentially about the flexible sealing portion, the support ring including at least one lug projecting therefrom, the lug defining a radius $R_3$ with respect to the center, where $R_3$ is greater than $R_2$; and
    a cap structure connected to the upper portion of said valve body and defining an inner surface having a radius $R_4$, where $R_1<R_2<R_3<R_4<(R_3+R_2-R_1)$.

2. The air admittance valve of claim 1, wherein the plumbing drain and waste system defines a first pressure $P_1$ and the ambient environment defines a second pressure $P_2$, and wherein the sealing member is responsive to a differential between $P_1$ and $P_2$.

3. The air admittance valve of claim 2, wherein the sealing member has a weight that is partially defined by gravity and a surface area that is partially defined by the flexible sealing portion, wherein a threshold pressure $P_T$ may be determined by dividing the weight by the surface area.

4. The air admittance valve of claim 3, wherein the sealing member is configured to unseal from the valve seat when $P_2-P_1 \geq P_T$.

5. The air admittance valve of claim 3, wherein the sealing member is configured to seal against the valve seat when $P_2-P_1 < P_T$.

6. The air admittance valve of claim 3, wherein the sealing member is configured to seal against the valve seat when $P_1=P_2$.

7. The air admittance valve of claim 1, wherein the at least one lug comprises three lugs that are circumferentially spaced about the support ring.

8. The air admittance valve of claim 1, wherein the at least one lug is configured to make contact with the inner surface of the cap structure such that the sealing member maintains a lateral position relative to the valve seat.

9. The air admittance valve of claim 1, wherein the flexible sealing portion is a diaphragm that is made from an elastomeric material.

10. The air admittance valve of claim 1, wherein the flexible sealing portion defines a tension with respect to the support ring, and wherein when the sealing member seals against the valve seat, the tension increases.

11. A one-way valve for selectively opening or closing a boundary between an inlet and an outlet so as to enable or prevent, respectively, the flow of fluid therebetween, the one-way valve comprising:
  a body having a lower connecting portion and an upper valve portion integrally connected to the lower portion, the upper valve portion including a centrally disposed valve chamber having an upper peripheral portion that terminates an edge, the edge defining a valve seat;
  a sealing member that is movable relative to the valve seat and configured to selectively seal against the valve seat, the sealing member defining a diaphragm and a support ring attached to an outer portion of the diaphragm, the support ring including at least one lug; and
  a cap connected to the body at the upper valve portion so as to create an airtight seal therewith, the cap having an inner portion that is defined by an interior surface, wherein the sealing member is configured such that the sealing member translates and angulates within the inner portion, and wherein the interior surface is configured such that the interior surface selectively abuts one or more of the at least one,
  wherein:
    the valve seat defines a center and a radius RV with respect to the valve center,
    the diaphragm defines a center and a radius RD with respect to the diaphragm center,
    the support ring defines a center and the at least one lug defines a radius $R_L$ with respect to the support ring center, and
    the cap defines a center and the interior surface defines a radius $R_C$ with respect to the cap center,
    such that: $R_V < R_D < R_L < R_C < (R_L + R_D - R_V)$.

12. The one-way valve of claim 11, wherein the outlet is in communication with a plumbing drain and waste system and wherein the inlet is in communication with an ambient environment, such that the plumbing drain and waste system defines a first pressure $P_1$ and the ambient environment defines a second pressure $P_2$, and wherein the sealing member is responsive to a differential between $P_1$ and $P_2$.

13. The one-way valve of claim 12, wherein the sealing member has a weight that is partially defined by gravity and a surface area that is partially defined by the diaphragm, wherein a threshold pressure $P_T$ may be determined by dividing the weight by the surface area.

14. The one-way valve of claim 13, wherein the sealing member is configured to unseal from the valve seat when $P_2 - P_1 \geq P_T$.

15. The one-way valve of claim 13, wherein the sealing member is configured to seal against the valve seat when $P_2 - P_1 < P_T$.

16. The one-way valve of claim 13, wherein the sealing member is configured to seal against the valve seat when $P_1 = P_2$.

17. The one-way valve of claim 11, wherein the at least one lug comprises three lugs that are circumferentially spaced about the support ring.

18. The one-way valve of claim 11, wherein the at least one lug is configured to make contact with the interior surface of the cap structure such that the sealing member maintains a lateral position relative to the valve seat.

19. The one-way valve of claim 11, wherein the diaphragm is made from an elastomeric material that defines a tension with respect to the support ring, and wherein when the sealing member seals against the valve seat, the tension increases.

* * * * *